United States Patent
Naumov et al.

(10) Patent No.: US 9,170,836 B2
(45) Date of Patent: Oct. 27, 2015

(54) SYSTEM AND METHOD FOR RE-FACTORIZING A SQUARE MATRIX INTO LOWER AND UPPER TRIANGULAR MATRICES ON A PARALLEL PROCESSOR

(71) Applicant: Nvidia Corporation, Santa Clara, CA (US)

(72) Inventors: Maxim Naumov, Santa Clara, CA (US); Sharanyan Chetlur, Banglore (IN); Lung Sheng Chien, Santa Clara, CA (US); Robert Strzodka, Santa Clara, CA (US); Philippe Vandermersch, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 501 days.

(21) Appl. No.: 13/737,287

(22) Filed: Jan. 9, 2013

(65) Prior Publication Data

US 2014/0196043 A1    Jul. 10, 2014

(51) Int. Cl.
*G06F 17/00*  (2006.01)
*G06F 9/46*   (2006.01)
*G06F 17/16*  (2006.01)

(52) U.S. Cl.
CPC . *G06F 9/46* (2013.01); *G06F 17/16* (2013.01)

(58) Field of Classification Search
CPC ........................................................ G06F 17/16
See application file for complete search history.

(56) References Cited

U.S. PATENT DOCUMENTS

| | | | |
|---|---|---|---|
| 7,181,384 B1 | 2/2007 | Riggs et al. | |
| 7,783,465 B2 | 8/2010 | Yang | |
| 7,822,590 B2 | 10/2010 | Kundert | |
| 8,156,457 B2 | 4/2012 | Basile et al. | |
| 2006/0265445 A1* | 11/2006 | Gustavson et al. | 708/520 |
| 2011/0257955 A1 | 10/2011 | Bertacco et al. | |
| 2013/0226535 A1* | 8/2013 | Tuan | 703/2 |

OTHER PUBLICATIONS

Ren, L., et al. "Sparse LU Factorization for Parallel Circuit Simulation on GPU"; Department of Electronic Engineering; Tsinghua National Laboratory for Information Science and Technology; Tsinghua University; Beijing, China; Design Automation Conference; Jun. 2-6, 2012; pp. 1125-1130.
Ren, L., et al. "Sparse LU Factorization for Parallel Circuit Simulation on GPU"; Power Point Slide Show; Department of Electronic Engineering; Tsinghua National Laboratory for Information Science and Technology; Tsinghua University; Beijing, China; Design Automation Conference; Jun. 2-6, 2012; 38 pages.

* cited by examiner

*Primary Examiner* — Zachary K Huson

(57) ABSTRACT

A system and method for re-factorizing a square input matrix on a parallel processor. In one embodiment, the system includes: (1) a matrix generator operable to generate an intermediate matrix by embedding a permuted form of the input matrix in a zeroed-out sparsity pattern of a combination of lower and upper triangular matrices resulting from a prior LU factorization of a previous matrix having a same sparsity pattern, reordering to minimize fill-in and pivoting strategy as the input matrix and (2) a re-factorizer associated with the matrix generator and operable to use parallel threads to apply an incomplete-LU factorization with zero fill-in on the intermediate matrix.

20 Claims, 2 Drawing Sheets

SYSTEM AND METHOD FOR RE-FACTORIZING A SQUARE MATRIX INTO LOWER AND UPPER TRIANGULAR MATRICES ON A PARALLEL PROCESSOR

TECHNICAL FIELD

This application is directed, in general, to parallel processors (i.e., computers having at least two processors capable of cooperating to carry out parallel processing) and, more specifically, to a system and method for re-factorizing a square matrix into lower and upper triangular matrices on a parallel processor.

BACKGROUND

Assuming they can be effectively programmed, parallel processors such as graphics processing units (GPUs) have the potential to be remarkably adept at processing numerical algorithms, and particularly algorithms for directly solving large sparse linear systems.

Sparse linear systems are systems of linear equations with sparse coefficient matrices. These systems arise in the context of computational mechanics, geophysics, biology, circuit simulation and many other contexts in the fields of computational science and engineering.

The most common general and direct technique to solve a sparse linear system is to decompose its coefficient matrix into the product of a lower triangular matrix, L, and an upper triangular matrix, U, a process called "factorization." Then, conventional forward and backward substitution techniques can be used to solve the linear systems with L and U triangular matrices and thereby obtain the solution of the sparse linear system.

SUMMARY

One aspect provides a system for re-factorizing a square input matrix on a parallel processor. In one embodiment, the system includes: (1) a matrix generator operable to generate an intermediate matrix by embedding a permuted form of the input matrix in a zeroed-out sparsity pattern of a combination of lower and upper triangular matrices resulting from an LU factorization of a previous matrix having a same sparsity pattern, reordering to minimize fill-in and pivoting strategy as the input matrix and (2) a re-factorizer associated with the matrix generator and operable to use parallel threads to apply an incomplete-LU factorization with zero fill-in (ILU0) on the intermediate matrix.

Another aspect provides a method of re-factorizing a square input matrix on a parallel processor. In one embodiment, the method includes: (1) generating an intermediate matrix by embedding a permuted form of the input matrix in a zeroed-out sparsity pattern of a combination of lower and upper triangular matrices resulting from an LU factorization of a previous matrix having a same sparsity pattern, reordering to minimize fill-in and pivoting strategy as the input matrix and (2) using parallel threads to apply an ILU0 on the intermediate matrix.

Yet another aspect provides a SIMD processor. In one embodiment, the SIMD processor includes: (1) lanes operable to process parallel threads, (2) a pipeline control unit system operable to control thread processing in the lanes and (3) a system for employing the lanes and the pipeline control unit to re-factorize a square input matrix, having: (3a) a matrix generator operable to generate an intermediate matrix by embedding a permuted form of the input matrix in a zeroed-out sparsity pattern of a combination of lower and upper triangular matrices resulting from an LU factorization of a previous matrix having a same sparsity pattern, reordering to minimize fill-in and pivoting strategy as the input matrix and (3b) a re-factorizer associated with the matrix generator and operable to transmit parallel threads to the pipeline control unit to apply an ILU0 on the intermediate matrix.

BRIEF DESCRIPTION

Reference is now made to the following descriptions taken in conjunction with the accompanying drawings, in which.

DETAILED DESCRIPTION

Figure 1:
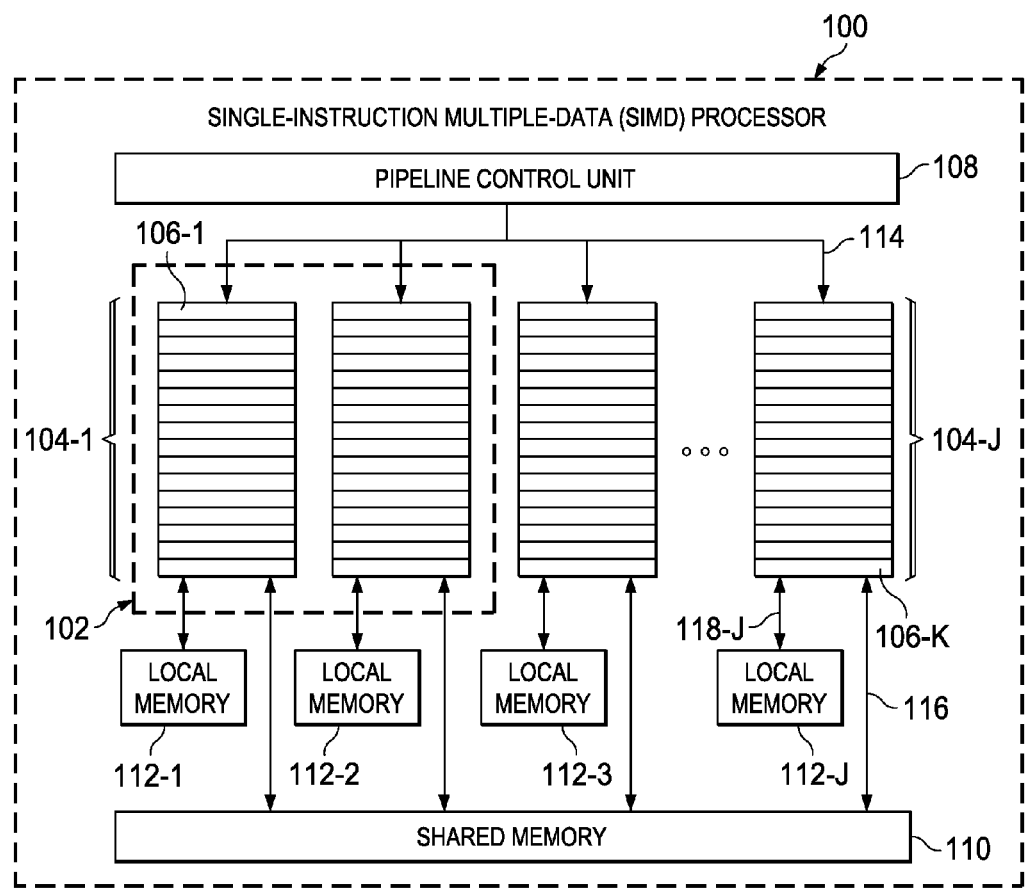
FIG. 1 is a block diagram of a SIMD processor operable to contain or carry out a system or method for re-factorizing a square matrix into lower and upper triangular matrices on a parallel processor.

As stated above, the most common general technique to solve a sparse linear system is to factorize its coefficient matrix into the product of lower and upper triangular matrices, L and U, respectively. It is realized herein that existing techniques are not well-suited to take advantage of the architecture of a parallel processor, such as a GPU.

Accordingly, introduced herein are various embodiments of a system and method for re-factorizing a square matrix into lower and upper triangular matrices. In general, the various embodiments are operable to accelerate applications for solving a set of a sparse linear system taking the form of:

$$A_i x_i = f_i \text{ for } i=1,\ldots,K,$$

where coefficient matrices $A_i \in \Re^{n \times n}$, the right-hand-sides $f_i \in \Re^n$, and the solutions $x_i \in \Re^n$.

Certain embodiments of a system and method are applicable when (1) the sparsity pattern of the coefficient matrices $A_i$, (2) the reordering to minimize fill-in and (3) the pivoting strategy used during the factorization remain the same across all the linear systems. In this case the sparsity pattern of the resulting lower ($L_i$) and upper ($U_i$) triangular factors for each of the linear systems also remains the same. These conditions frequently arise in the simulation of integrated circuits using the well-known Simulation Program with Integrated Circuit Emphasis (SPICE).

In these certain embodiments, LU factorization needs to be performed only the first time (for i=1). Subsequently, (for i=2, ..., k) only LU re-factorization needs to be performed. Since applying the LU factorization on the sparsity pattern of $L_i$ and $U_i$ factors generates no additional fill-in, the memory needed for the re-factorization can be statically allocated. Therefore, LU re-factorization is in general much faster than the LU factorization. In some embodiments, re-factorization can be carried out in tens of seconds or a few minutes on a modern SIMD processor, whereas factorization may require many hours.

Thus, it is realized herein that for i=2, ..., k the coefficient matrix $A_i$ can be embedded in the sparsity pattern of the zeroed-out lower and upper triangular factors resulting from the first (i=1) factorization, viz.:

$$M_i = L_1^{(Z)} + U_1^{(Z)} + A_i,$$

where $L_1^{(z)} = L_I$ and $U_1^{(z)} = U_1$ filled in with zeros. Since the application of LU factorization on the matrices $L_i$ and $U_i$ does not generate additional fill-in, it is realized herein that ILU0 can then be applied to this newly generated intermediate matrix $M_i$ to produce the LU re-factorization of the coefficient matrix $A_i$.

In certain embodiments, the reordering to minimize fill-in and pivoting can be accounted for by embedding the permuted matrix $P^T*A_i*Q$, instead of the coefficient matrix $A_i$, so that:

$$M_i = L_1^{(Z)} + U_1^{(Z)} + P^T*A_i*Q,$$

where $P^T$ and $Q$ are the permutation matrices corresponding to the reordering to minimize fill-in and pivoting used in the first (i=1) LU factorization.

The problem of LU re-factorization of the coefficient matrix $A_i$ has therefore been recast as that of an ILU0 of the intermediate matrix $M_i$, for i=2, ..., k. It is realized that the latter can be effectively carried out on a parallel processor, such as GPU. Before describing the novel system and method in greater detail, a representative computing system containing a GPU will now be described.

FIG. 1 is a block diagram of a SIMD processor 100 operable to contain or carry out a system or method for re-factorizing a square matrix into lower and upper triangular matrices on a parallel processor. SIMD processor 100 includes multiple thread processors, or cores 106, organized into thread groups 104, or "warps." SIMD processor 100 contains J thread groups 104-1 through 104-J, each having K cores 106-1 through 106-K. In certain embodiments, thread groups 104-1 through 104-J may be further organized into one or more thread blocks 102. One specific embodiment has thirty-two cores 106 per thread group 104. Other embodiments may include as few as four cores in a thread group and as many as several tens of thousands. Certain embodiments organize cores 106 into a single thread group 104, while other embodiments may have hundreds or even thousands of thread groups 104. Alternate embodiments of SIMD processor 100 may organize cores 106 into thread groups 104 only, omitting the thread block organization level.

SIMD processor 100 further includes a pipeline control unit 108, shared memory 110 and an array of local memory 112-1 through 112-J associated with thread groups 104-1 through 104-J. Thread execution control unit 108 distributes tasks to the various thread groups 104-1 through 104-J over a data bus 114. Cores 106 within a thread group execute in parallel with each other. Thread groups 104-1 through 104-J communicate with shared memory 110 over a memory bus 116. Thread groups 104-1 through 104-J respectively communicate with local memory 112-1 through 112-J over local buses 118-1 through 118-J. For example, a thread group 104-J utilizes local memory 112-J by communicating over a local bus 118-J. Certain embodiments of SIMD processor 100 allocate a shared portion of shared memory 110 to each thread block 102 and allow access to shared portions of shared memory 110 by all thread groups 104 within a thread block 102. Certain embodiments include thread groups 104 that use only local memory 112. Many other embodiments include thread groups 104 that balance use of local memory 112 and shared memory 110.

Having described a representative computing system containing a GPU, various embodiments of the novel system and method will now be described in greater detail. Various embodiments of the system and method employ various novel techniques.

Figure 2:
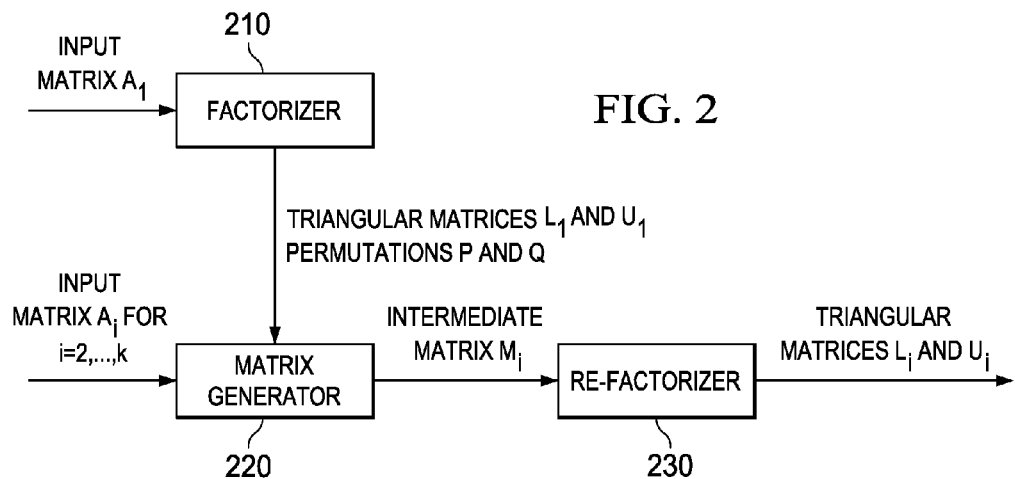
FIG. 2 is a flow diagram of one embodiment of a system for re-factorizing a square matrix into lower and upper triangular matrices on a parallel processor.

FIG. 2 is a block diagram of one embodiment of a system for re-factorizing a square matrix into lower and upper triangular matrices on a parallel processor. A factorizer 210, which is not part of many of the embodiments of the system, is operable to receive the square matrix $A_1$ as an input matrix and perform a LU factorization of the matrix to yield a lower triangular matrix, $L_1$, and an upper triangular matrix, $U_1$, as well as the reordering to minimize fill-in and pivoting permutations P and Q used in the factorization.

A matrix generator 220 is associated with the factorizer 210 and is operable for i=2, ..., k to generate the intermediate matrix $M_i$ by embedding the permuted input matrix $P^T*A_i*Q$ in a zeroed-out sparsity pattern of a combination of lower and upper triangular matrices $L_1^{(z)} + U_1^{(z)}$ resulting from the first LU factorization. A re-factorizer 230 is associated with the matrix generator 220 and is operable for i=2, ..., k to use parallel threads to apply an ILU0 on the generated intermediate matrix $M_i$.

It is realized herein that row update is essentially a step of Gaussian elimination, where a reference (pivot) row is scaled by a multiplier and added to the current row in order to create zeros below the main diagonal. The multipliers are computed and stored in place of zeros created by this update. In some embodiments of the novel system and method, in order to explore the available parallelism, columns are grouped into levels instead of rows. It is realized herein that the conventional technique of grouping rows into levels not only is more intuitive, but also makes the process of finding data dependencies more straightforward. However, it is realized herein that grouping rows into levels substantially hinders processing speed. It is specifically realized that rows near the bottom of the matrix tend to have far more nonzero elements than other rows, making updates of those rows relatively slow. In contrast, grouping columns into levels often allows us to achieve a better load balancing of work by more evenly distributing the computation associated with the bottom rows across multiple columns. Grouping columns into levels can result in a significant improvement in processing speed, perhaps by several orders of magnitude.

Grouping columns into levels also yields another potential advantage. The bottom right corner of the matrix may be packaged into dense storage and dense LU factorization (without pivoting) may be employed to process it. In one embodiment, the packaging happens only if the bottom right corner contains enough elements per row to justify the extra computation in the dense format. However, it is realized herein that this is often the case.

In other embodiments of the systems and method, the matrix is kept in a merged Compressed Sparse Row/Compressed Sparse Column (CSR-CSC) format. The merged CSR-CSC format is composed of both standard CSR and CSC formats. The CSR format is conventional and contains an array of matrix values, among other things. The CSC format is conventional except that, instead of the actual matrix values, it contains pointers to the values contained in the CSR format. The merged CSR-CSC format allows the update that takes place during the ILU0 to occur in place with respect to the single array of values in the CSR format. The CSC format pointers require no updating.

In yet other embodiments of the system and method, the analysis phase computes individual grid and block launch parameters for every level because of a huge difference in the number of elements per row early and late in the matrix $M_i$.

In still other embodiments of the system and method, the analysis may schedule two kernel launches per level instead of using a single kernel launch to process a level (with a single thread block in x-dimension per row). If two kernels are launched, the first kernel may update the multipliers (with a single thread block in x-dimension per row), and the second kernel may update the remaining elements in a row (with multiple thread blocks in x-dimension per row).

In certain embodiments, during the row update in the LU re-factorization, a search for the elements of the reference (pivot) row in the current row, rather than searching for elements of the current row in the reference (pivot) row, is undertaken. Searching in this manner yields two potential advantages. First, if the number of elements in the reference (pivot) row is "n" and in the current row is "m", then $m \geq n$ given the construction of $M_i$. Thus, the former and the latter approaches involve $O(m*\log(n))$ and $O(n*\log(m))$ steps, respectively. Therefore, the latter approach involves fewer steps and is less computationally expensive. Also, by the construction of $M_i$, the elements of the reference (pivot) row are known always to be present in the current row, which minimizes thread divergence.

Figure 3:
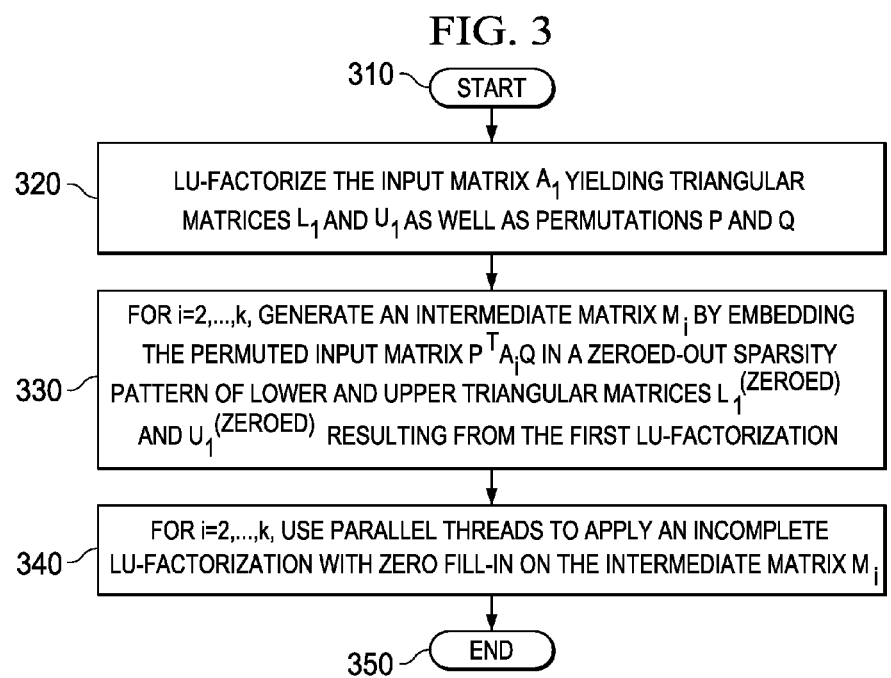
FIG. 3 is a block diagram of one embodiment of a method of re-factorizing a square matrix into lower and upper triangular matrices on a parallel processor.

FIG. 3 is a flow diagram of one embodiment of a method of re-factorizing a square matrix into lower and upper triangular matrices on a parallel processor. The method begins in a start step 310. In a step 320, the input matrix $A_1$ is LU factorized to yield a lower triangular matrix, $L_1$, and an upper triangular matrix, $U_1$, as well as the reordering to minimize fill-in and pivoting permutations P and Q used in the factorization. In a step 330, for i=2, . . . , k an intermediate matrix $M_i$ is generated by embedding a permuted form of the input matrix $P^T*A_i*Q$ in a zeroed-out sparsity pattern of a combination of lower and upper triangular matrices $L_1^{(z)}+U_1^{(z)}$ resulting from the prior LU factorization. In a step 340, parallel threads are used to apply an ILU0 on the generated intermediate matrix $M_i$. The method ends in an end step 350.

Those skilled in the art to which this application relates will appreciate that other and further additions, deletions, substitutions and modifications may be made to the described embodiments.

What is claimed is:

1. A system for re-factorizing a square input matrix on a parallel processor, comprising:
a matrix generator operable to generate an intermediate matrix by embedding a permuted form of said input matrix in a zeroed-out sparsity pattern of a combination of lower and upper triangular matrices resulting from an LU factorization of a previous matrix having a same sparsity pattern, reordering to minimize fill-in and pivoting strategy as said input matrix; and
a re-factorizer associated with said matrix generator and operable to use parallel threads to apply an incomplete-LU factorization with zero fill-in on said intermediate matrix.

2. The system as recited in claim 1 wherein said intermediate matrix generator is operable to embed said permuted form in said sparsity pattern.

3. The system as recited in claim 1 wherein said re-factorizer is further operable to performing a symbolic analysis on said input matrix to group independent nodes representing columns thereof into levels representing data dependencies between said nodes.

4. The system as recited in claim 1 wherein said re-factorizer is further operable to employ a merged compressed sparse row-compressed sparse column format in carrying out said incomplete-LU factorization with zero fill-in.

5. The system as recited in claim 1 wherein said re-factorizer is further operable to compute grid and block launch parameters particular to each level in defining a configuration of said parallel threads.

6. The system as recited in claim 1 wherein said re-factorizer is further operable to launch said parallel threads as two concurrent kernels per level of said subsequent matrix, one of said kernels operable to update multipliers in said level and another of said kernels operable to update remaining elements in said level.

7. The system as recited in claim 6 wherein said re-factorizer is further operable with a SIMD processor to launch said parallel threads.

8. A method of re-factorizing a square input matrix on a parallel processor, comprising:
generating an intermediate matrix by embedding a permuted form of said input matrix in a zeroed-out sparsity pattern of a combination of lower and upper triangular matrices resulting from an LU factorization of a previous matrix having a same sparsity pattern, reordering to minimize fill-in and pivoting strategy as said input matrix; and
using parallel threads to apply an incomplete-LU factorization with zero fill-in on said intermediate matrix.

9. The method as recited in claim 8 wherein said embedding comprises embedding said permuted form in said sparsity pattern.

10. The method as recited in claim 8 wherein said using comprises performing a symbolic analysis on said input matrix to group independent nodes representing columns thereof into levels representing data dependencies between said nodes.

11. The method as recited in claim 8 wherein said using comprises employing a merged compressed sparse row-compressed sparse column format in carrying out said incomplete-LU factorization with zero fill-in.

12. The method as recited in claim 8 wherein said using comprises computing grid and block launch parameters particular to each level in defining a configuration of said parallel threads.

13. The method as recited in claim 8 wherein using comprises launching said parallel threads as two concurrent kernels per level of said subsequent matrix, one of said kernels operable to update multipliers in said level and another of said kernels operable to update remaining elements in said level.

14. The method as recited in claim 13 wherein said using comprises employing a SIMD processor to launch said parallel threads.

15. A SIMD processor, comprising:
lanes operable to process parallel threads;
a pipeline control unit system operable to control thread processing in said lanes; and
a system for employing said lanes and said pipeline control unit to re-factorize a square input matrix, including:
a matrix generator operable to generate an intermediate matrix by embedding a permuted form of said input matrix in a zeroed-out sparsity pattern of a combination of lower and upper triangular matrices resulting from an LU factorization of a previous matrix having a same sparsity pattern, reordering to minimize fill-in and pivoting strategy as said input matrix, and
a re-factorizer associated with said matrix generator and operable to transmit parallel threads to said pipeline control unit to apply an incomplete-LU factorization with zero fill-in on said intermediate matrix.

16. The processor as recited in claim 15 wherein said intermediate matrix generator is operable to embed said permuted form in said sparsity pattern.

17. The processor as recited in claim 15 wherein said re-factorizer is further operable to performing a symbolic analysis on said square matrix to group independent nodes representing columns thereof into levels representing data dependencies between said nodes.

18. The processor as recited in claim 15 wherein said re-factorizer is further operable to employ a merged compressed sparse row-compressed sparse column format in carrying out said incomplete-LU factorization with zero fill-in.

19. The processor as recited in claim 15 wherein said re-factorizer is further operable to compute grid and block launch parameters particular to each level in defining configuration of said parallel threads.

20. The processor as recited in claim 15 wherein said re-factorizer is further operable to launch said parallel threads as two concurrent kernels per level of said intermediate matrix, one of said kernels operable to update multipliers in said level and another of said kernels operable to update remaining elements in said level.

\* \* \* \* \*